UNITED STATES PATENT OFFICE.

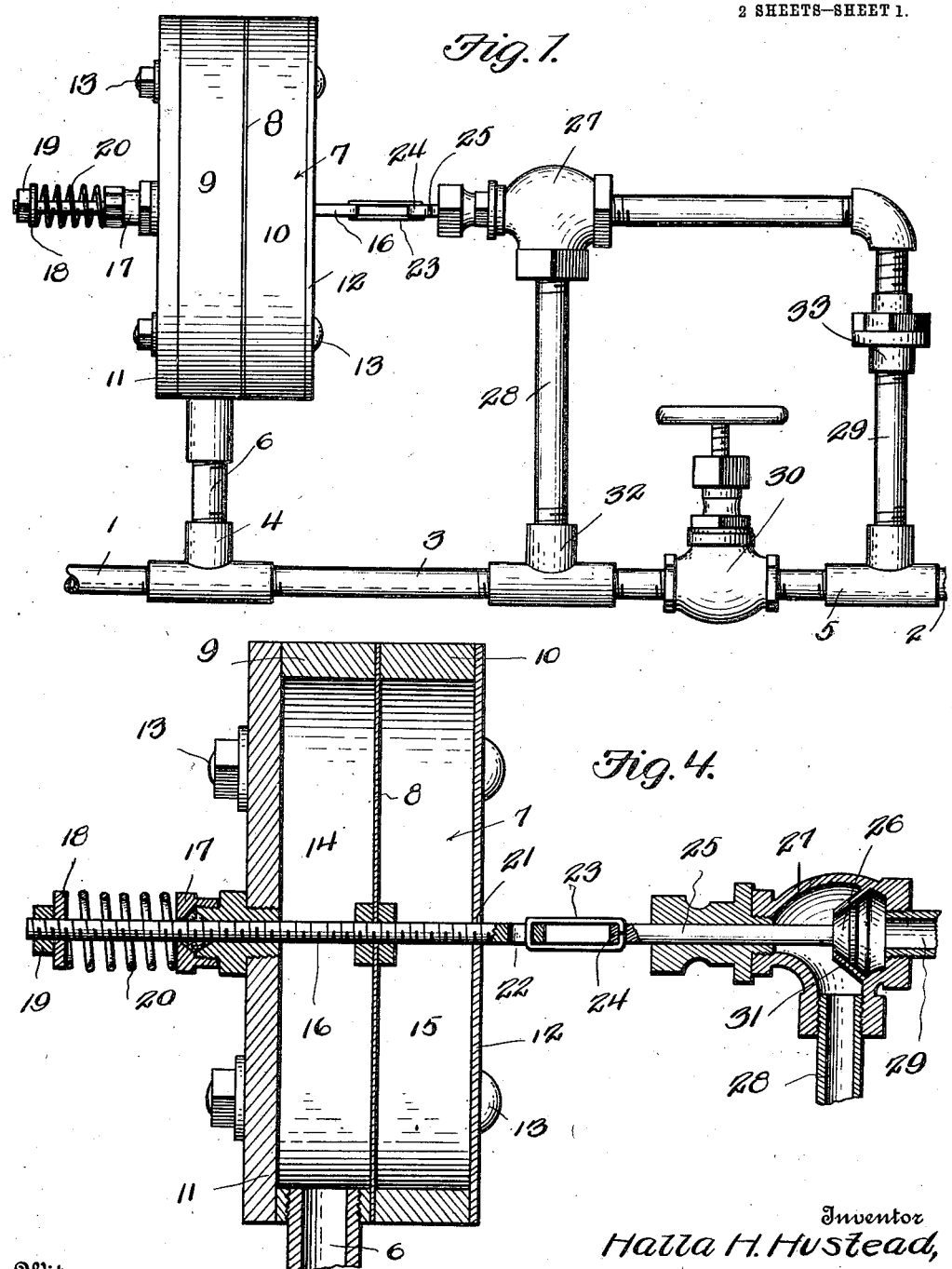

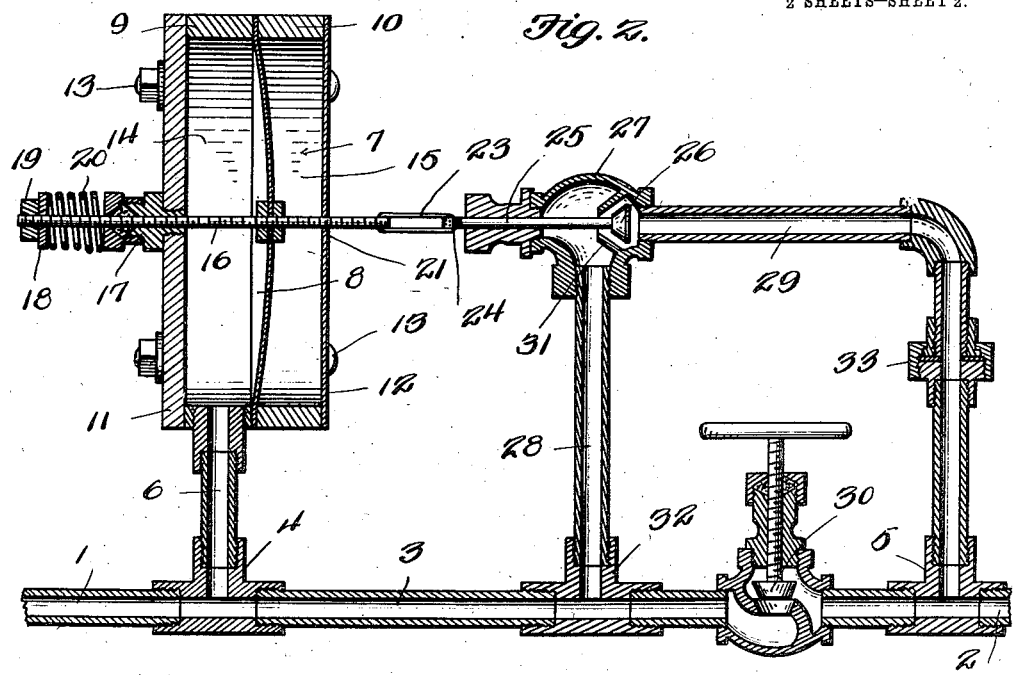
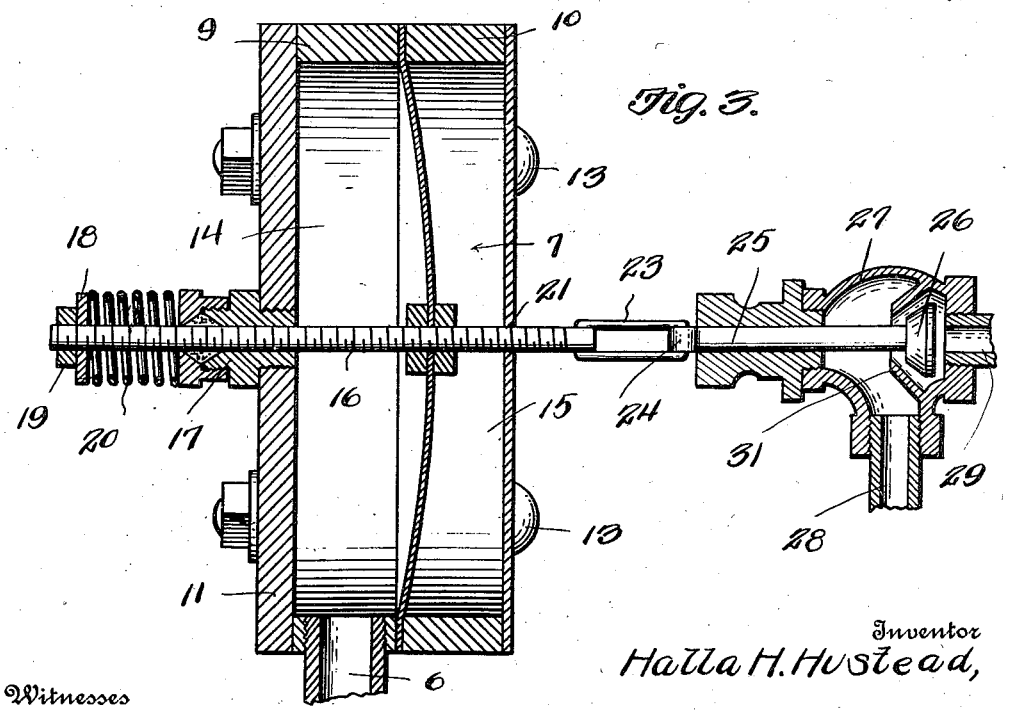

HALLA H. HUSTEAD, OF BROWN, WEST VIRGINIA.

SAFETY GAS CUT-OFF.

1,033,700.    Specification of Letters Patent.    Patented July 23, 1912.

Application filed August 9, 1910. Serial No. 576,373.

*To all whom it may concern:*

Be it known that I, HALLA H. HUSTEAD, a citizen of the United States, residing at Brown, in the county of Harrison and State of West Virginia, have invented new and useful Improvements in Safety Gas Cut-Offs, of which the following is a specification.

This invention relates to a safety gas cut-off for use between a gas main and the gas service pipe of a house for automatically cutting off the supply of gas to the house when the pressure of the gas in the main is materially reduced or cut off.

The object of the invention is to provide a simple, effective and reliable device of this character which will positively cut off communication between the main and service pipe under the conditions above mentioned and prevent the flow of gas to the service pipe when the normal pressure in the main is resumed until the cut-off is manually reset for further operation, thus avoiding all liability of danger to the occupants of a house by the resumption of the flow of gas through open burners.

The invention consists of the features of construction, combination and arrangement of parts, hereinafter fully described and claimed, reference being had to the accompanying drawings, in which:—

Figure 1 is a view in side elevation of a safety cut-off embodying my invention, shown arranged in position for use. Fig. 2 is a vertical longitudinal section of the same, with the valve open for service operation. Fig. 3 is a similar view on an enlarged scale of the valve and diaphragm arranged for service operation as in Fig. 2. Fig. 4 is a similar section showing the valve closed to cut off the flow of gas to the service pipe.

Referring to the drawings, 1 designates the gas main or a supply pipe leading therefrom, and 2 the house service pipe, between which pipes my improved cut-off is interposed. The cut-off comprises a conducting pipe 3 having terminal T-couplings 4 and 5 connecting the same with the pipes 1 and 2. Connected with the coupling 4 and leading upwardly therefrom is a branch pipe 6 communicating with a pressure chamber or casing 7 in which is arranged a diaphragm 8 or its equivalent, such as a piston of any preferred type. The casing 8 comprises a body portion divided or formed of two sections 9 and 10 and end heads 11 and 12 coupled together by bolts 13. The diaphragm 8, which consists of a body of fabric or other suitable material, is clamped at its marginal edge between the proximal edges of the sections 9 and 10 and separates the casing into two compartments 14 and 15, the pipe 6 communicating with the compartment 14, as shown.

Attached centrally to the diaphragm 8 is a rod or stem 16 which extends at its rear end through the head 11 and through a stuffing box 17 carried thereby and carries a washer 18 and a retaining nut 19. Between the stuffing box 17 and the washer 18 a coiled spring 20 surrounds the stem and exerts its expansive pressure upon the washer to normally hold the diaphragm against movement toward the compartment 15 under the pressure of the gas thereon within the compartment 14. The tension of the spring may be regulated by adjusting the nut 19 so as to adapt the diaphragm to have movement or fluctuate under the gas pressure when the pressure in the main is at or above normal service pressure, the spring at all other times holding the diaphragm in normal position against movement. The opposite end of the stem 16 projects outward through an opening 21 in the head 12 in which it is freely movable, the opening being of such size as to permit free inlet and exit of air to and from the compartment 15 to enable the diaphragm to have a sensitive action. The extremity of such end of the stem is formed with a longitudinal slot 22 connected by a slotted link 23 with an eye 24 on the outer rear end of the stem 25 of the cut-off valve 26. The valve 26 is arranged within a casing 27 forming a coupling uniting two branch pipes 28 and 29 forming a bypass between the coupling 5 and the pipe 3 at a point between said coupling 5 and the coupling 4, a stop valve 30 being arranged in said pipe 3 between the branch 28 and coupling 5 so that the direct flow of gas from the pipe 3 to the pipe 2 may be cut off to cause the gas to pass normally through the bypass, while at the same time enabling a direct supply of gas to be obtained in the event of casual derangement of the valve 26. The valve 26 is movable inwardly to close against a seat 31 and is movable outwardly from said seat for the flow of gas from the branch pipe 28 to the branch pipe 29 under normal service conditions, the direction of closing movement of the valve being such as to adapt it to be drawn against its seat by the action of the spring 20 in restoring the diaphragm to normal position in the event of the diminishment of pressure in the chamber 14 from the cessation or material decrease of pressure of the gas in the main. The pipe 28 is connected with the pipe 3 and the valve 30 by a coupling 32, which connects said coupling 32 with the coupling 5, and the pipe 29 is preferably composed of two main sections united by a coupling 33, such couplings adapting the parts to be conveniently assembled for use and disassembled for repairs or replacement in the event of injury thereto, as well as to permit free access to the valve 26 for cleaning whenever circumstances require.

The slotted portion 22 of the stem 16 and the link 23 form a slip joint, lost-motion or slot and pin connection between the stem 16 and the valve 25 to adapt the valve to be positively closed by the spring 20 when the diaphragm is relieved of normal pressure, and to prevent movement of the valve to open position by the subsequent action of the diaphragm in the event of the restoration of normal pressure in the main, thus requiring the valve, after having been once closed, to be manually opened before the gas can again pass from the main to the service pipe.

Figs. 2 and 3 show the position of the parts when the valve is open for normal service operation, from which it will be seen that the diaphragm 8 is pressed forward by the pressure of the gas within the compartment 14, thus compressing the spring 20, and that the forward movement of the valve to open position disposes the rear end of the link 23 adjacent the forward end of the slotted portion 22 of the stem 16, whereby the diaphragm is permitted, without affecting the valve 26, to fluctuate slightly back and forth under slight variations of the pressure in the main, the link playing loosely in the slot 22. When, however, the pressure in the main is materially reduced or entirely cut off, the spring 22 restores the diaphragm to normal position, and in so doing moves the stem 16 rearwardly, causing the forward end of the slotted portion 22 to engage the link 23 and to move the valve 26 to closed position, thus cutting off communication between the main and service pipe through the bypass. As the valve 30 under normal conditions is also closed, direct communication between the main and service pipe will also at this time be entirely cut off. If there should be a resumption of normal pressure in the main under these conditions, the diaphragm will again be moved forward and the spring 20 compressed, thus communicating forward motion to the stem 16, but owing to the position of the rear end of the link in the slotted portion 22 the latter will be permitted to have relative movement without affecting said link, and consequently without disturbing the position of the valve 26, so that communication between the main and service pipe will remain cut off. Such communication, therefore, can only be restored by the adjustment of the valve to open position by manual operation, by which the parts will be returned to the position shown in Figs. 2 and 3, so that after the valve 26 is once closed automatically it will remain in closed position uninfluenced by the subsequent action of the diaphragm until it is manually reset to open position.

It will thus be understood that if at any time when the burners in a house are in use and the flow of gas through the main is arrested from any cause, as through the shutting down of the gas plant or the cut off of communication between the gas reservoir and the main, the automatic cut off will be instantly set into operation to close the valve 26 and close communication between the main and the house service pipe, so that if the flow of pressure in the main should be suddenly restored the flow of gas into the house through the open burners will be prevented. It will be apparent that the occupants of a household will be warned in an obvious manner of the condition of affairs and the fact that the safety valve has been closed, and may restore normal service conditions by manually resetting or opening the valve.

I claim:—

In an automatic safety gas cut-off, the combination of a conductor, a valve casing therein, a non-rotary sliding valve in said casing manually adjustable to open position in the direction of the course of flow of the gas, a non-rotary sliding controlling stem arranged in axial alinement with the valve stem and having a longitudinally slotted end portion, a diaphragm connected with said controlling stem and movable under the force of the gas pressure to slide said controlling stem toward the valve stem, spring means acting on the controlling stem and diaphragm to oppose such motion thereof, and a slotted link carried by the valve stem and slidably engaging the slotted end of the controlling stem and forming therewith a permanent slip-joint connection between said stems, the construction being such that when the valve is open a coupling engagement is afforded whereby the valve may be closed through the retraction of the controlling stem by the action of the spring
5 means when the diaphragm is relieved from pressure, while, when the valve is closed, said controlling stem is permitted to have movement without opening said valve.

In testimony whereof I affix my signature in presence of two witnesses.

HALLA H. HUSTEAD.

Witnesses:
   I. L. DAVISSON,
   B. L. RITTENHOUSE.